2,847,246
AIR-VENT EXTENSION DEFLECTOR
Charles Caradonna, Detroit, Mich.

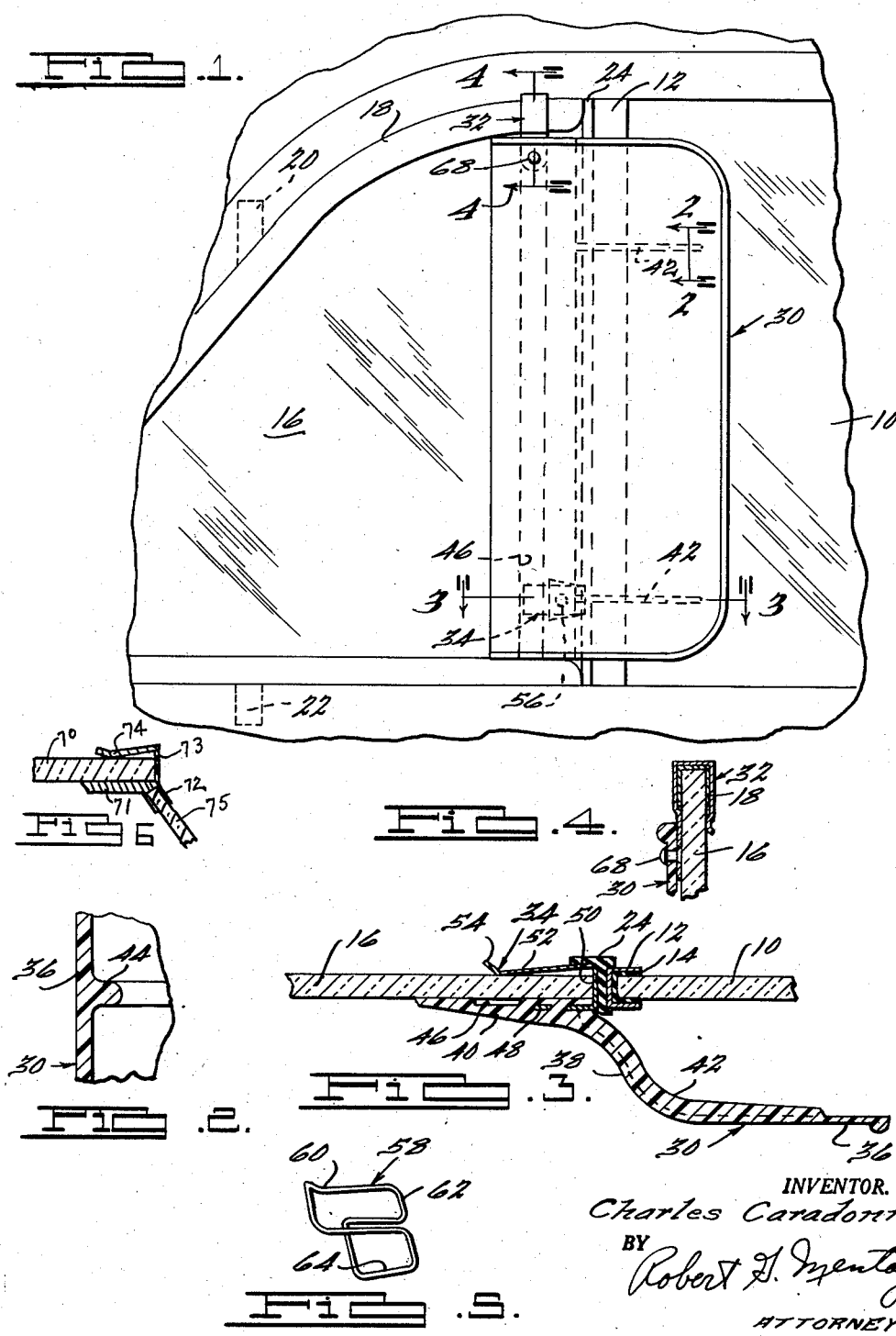
Aug. 12, 1958 — C. CARADONNA — 2,847,246
AIR-VENT EXTENSION DEFLECTOR
Filed Oct. 11, 1954

Application October 11, 1954, Serial No. 461,557

2 Claims. (Cl. 296—44)

My invention relates to ventilators for automobiles and other vehicles and, more particularly, to a wind deflecting extension adapted for use in connection with the no-draft window of an automobile to prevent the suction and accompanying noise caused by opening the side front window when the automobile is traveling at high speed.

An important object of the invention is to provide an air-vent extension deflector for an automobile or the like, which is readily installable on the no-draft window of the automobile to serve as a wind deflector for the front side window when said side window is rolled down and thereby shield the interior of the automobile from the elements, as rain and snow.

Another object of the invention is to provide an extension for the no-draft window of an automobile which improves the circulation effect of said window.

A further object of the invention is to provide an air-vent extension for use on all present types of automobile vent windows.

A still further object of the invention is to provide an air-vent extension deflector which is simple and compact in construction, economical to manufacture and pleasing in appearance.

Other objects will appear hereinafter.

It is recognized that various modifications and changes may be made in the detail of the structure illustrated without departing from the invention, and it is intended that the present disclosure shall be considered to be but the preferred embodiment.

Forming a part of this application are drawings in which,

Fig. 1 is a fragmentary elevation of the front side window area of an automobile showing a preferred embodiment of the invention in operative position.

Fig. 2 is a vertical sectional view of the structure illustrated in Figure 1, taken along the line 2—2 thereof.

Fig. 3 is a horizontal sectional view of the structure illustrated in Figure 1, taken along the line 3—3 thereof.

Fig. 4 is a vertical sectional view of the upper clip structure which holds the upper end of the air-vent extension deflector onto the no-draft window of an automobile or the like.

Fig. 5 is a perspective view of a modified clip for holding the lower end of the air-vent extension deflector onto the no-draft window of an automobile or the like.

Fig. 6 is a horizontal sectional view similar to the view of Fig. 3 but showing a modified embodiment of the invention.

Referring now to the drawings and, particularly, to Figure 1, the reference numeral 10 designates the front window of an automobile which is slidable upwardly and downwardly in the channel member 12. A felt 14 or the like is provided in the channel member 12 between said channel and the window 10 to provide for easy operation of the window 10.

The numeral 16 designates the usual no-draft type of window which is found on most automobiles as made today. The no-draft window 16 is pivotally mounted in the automobile body by the usual means as by pivots 20 and 22. The pivots 20 and 22 are carried by the edge channel member 18 in which the glass member of the no-draft window is mounted.

As is best seen in Figures 1 and 3, a vertical weatherstrip member 24 is provided between the rearward end of the no-draft window 16 and the window channel 12.

The air-vent extension deflector is designated by the numeral 30 and is held onto the rearward end of the no-draft window 16 by means of the pivotally mounted clip 32 and the stationary clip 34. As is best seen in Figure 3, the deflector comprises a wing or vane having an outer portion 36 which is disposed parallel to the side window 10 when the no-draft window 16 is closed. The vane also includes an inner portion 40 which is connected to the outer portion 36 by means of the faired and outwardly extending portion 38. The vane is provided with a rib, as indicated by the numeral 42, along the top and bottom of the connecting portion 38 and outer portion 36. The inner portion 40 is provided with a vertically extending rib 46 in the upper end of which is seated the clip 32. The clip 32 is pivotally mounted on the inner portion 40 by any suitable means, as by the pin 68.

The lower clip comprises an outer portion 48 adapted to be embedded in the inner vane portion 40 in any suitable manner, as by being pressed therein or molded therein. The lower clip 34 further includes an inwardly extending portion 50 integral with the clip portion 48 and with an inner portion 52, and this is best seen in Figure 3. The inner clip portion 52 is provided with a lip as 54 to assist in mounting the clip on the no-draft window 16. The clip 34 is suitably fixed to the vane 30, as by means of the pin 56.

In Figure 5 is shown a modified lower clip 58 which comprises the parts 60, 62 and 64, and which is made from a suitable spring wire. The part 64 would function in the same manner as the outer portion 48 of clip 34. That is, it would be embedded in the inner vane portion 40 in any suitable manner, as by being pressed therein or molded therein. The part 60 would be mounted on the rear edge of the no-draft window 16 in the same manner as portion 52 of clip 34. The lower clip 34 is made of a solid suitable spring sheet metal. The modified clip 58 would be less obstructive to the vision of a rider in the automobile on which the deflector may be mounted.

In use, the novel deflector is mounted on the no-draft window 16 by merely snapping the upper pivotal clip 32 on top of the channel member 18, as shown in Figure 4. The vane 30 is then pivoted downwardly to permit the lower clip 34 to be snapped onto the lower portion of the no-draft window 16.

The deflector vane portions 36, 38 and 40 are preferably molded as an integral unit from a suitable plastic which may be of any desired color. A transparent plastic is suitable since it does not obstruct the vision of the driver as would a darker color.

Figure 6 shows another embodiment in which the numeral 70 indicates the no-draft window of an automobile. The modified air-vent extension deflector comprises a clip member as 71 disposed along the outer face of the no-draft window 70 and being provided with outwardly extending and spaced members or arms 72 in which is suitably retained a deflector member 75. The deflector member 75 would be comprised of either glass or a suitable plastic and preferably press fitted into the arms 72. The deflector member 75 could extend outwardly at any desired angle, but an angle of about 45° is preferable. The deflector member 75 would function in the same manner as the vane 30 for the embodiment of Figure 1.

The clip member 71 would be attached to the no-draft window 70 in any suitable manner as by having an integral snap portion to fit around the after end of the no-draft window. The snap portion would comprise an inwardly extending portion as 73 and a second portion as 74 adapted to grip the inside surface of the no-draft window. It will be understood, that the clip member, and its associated parts 72, 73 and 74, may be made from either a suitable metal or plastic. Also, the clip member may extend the full length of the deflector member 75 or be formed of a plurality of spaced clip members. The deflector member 75 would, of course, extend the full height of the no-draft window in the same manner as would that shown in Figure 1, namely, the vane member 30.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In combination with a vertically pivoted vehicle ventilator, an air-vent extension deflector of the class described comprising, a vertical outwardly directed transparent vane, said vane comprising an inner portion parallel to and abutting the ventilator at the rearward edge thereof, an outer portion parallel to the inner portion but offset outwardly therefrom, an intermediate portion curved so as to integrally join said inner and outer portions, said portions being of equal height throughout the entire lengths thereof and means for detachably fastening the vane to the rearward edge of the ventilator.

2. An air-vent extension deflector of the class described, for use on a vertically pivoted vehicle ventilator comprising: a vertical outwardly directed transparent vane; said vane comprising an inner portion parallel to and adapted to abut the ventilator at the rearward edge thereof; an outer portion parallel to the inner portion but offset outwardly therefrom; an intermediate portion curved so as to integrally join said inner and outer portions; a first clip fixed to the lower portion of the vane and adapted for attachment to the rearward edge of the ventilator; and, a second clip pivotally attached to the top of the vane and adapted for attachment to the upper channel of the ventilator.

References Cited in the file of this patent

UNITED STATES PATENTS

| | | |
|---|---|---|
| 1,443,713 | Maulding | Jan. 30, 1923 |
| 2,141,442 | Mead et al. | Dec. 27, 1938 |
| 2,147,855 | Normandin | Feb. 21, 1939 |
| 2,478,161 | Russell | Aug. 2, 1949 |
| 2,499,127 | Beard | Feb. 28, 1950 |
| 2,513,744 | Rawson | July 4, 1950 |
| 2,622,920 | Zagel | Dec. 23, 1952 |

FOREIGN PATENTS

| | | |
|---|---|---|
| 658,132 | Great Britain | Oct. 3, 1951 |
| 694,708 | Great Britain | July 22, 1953 |